(12) United States Patent
Chen et al.

(10) Patent No.: US 6,968,099 B2
(45) Date of Patent: Nov. 22, 2005

(54) OPTICAL SWITCH

(75) Inventors: Chien Cheng Chen, Tu-Chen (TW);
Kun-Tsan Wu, Tu-Chen (TW)

(73) Assignee: Hon Hai Precision Ind. Co., Ltd.,
Taipei Hsien (TW)

( * ) Notice: Subject to any disclaimer, the term of this patent is extended or adjusted under 35 U.S.C. 154(b) by 451 days.

(21) Appl. No.: 10/033,478

(22) Filed: Dec. 27, 2001

(65) Prior Publication Data

US 2003/0048978 A1    Mar. 13, 2003

(30) Foreign Application Priority Data

Sep. 12, 2001  (TW) .............................. 90215722 U (51) Int. Cl.[7] .............................. G02B 6/35; G02B 5/04
(52) U.S. Cl. .............................. 385/16; 385/21; 385/36; 359/831; 359/837
(58) Field of Search .............................. 385/16–23, 36; 359/831, 837, 234, 236

(56) References Cited

U.S. PATENT DOCUMENTS 5,642,446 A * 6/1997 Tsai .............................. 385/16
6,396,975 B1 * 5/2002 Wood et al. .................. 385/18

* cited by examiner

*Primary Examiner*—Frank G. Font
*Assistant Examiner*—Michael P. Mooney
(74) *Attorney, Agent, or Firm*—Wei Te Chung (57) ABSTRACT

An optical switch (10) includes a housing (3), an input port (4), an output port (5), a switching element (6), a holder (7), and a driver (63). The holder holds the input and output ports in alignment with one another and is assembled with the switching element. The switching element includes an optical component assembly (61) and a rotating mechanism (60). The optical component assembly is fixed on the rotating mechanism and is brought to move between a top stopper (85) (an upward position), wherein the optical component assembly is out of optical paths running between the input port and the output port, and a bottom stopper (86) (a downward position), wherein the optical component assembly is in the optical paths. The optical component assembly includes a prism (612), which redirects optical paths passing through it, thereby effecting switching between the input and output ports.

21 Claims, 8 Drawing Sheets

OPTICAL SWITCH

BACKGROUND OF THE INVENTION

1. Field of the Invention

The present invention relates to an optical switch for use in optical fiber communication and optical network technology, and particularly to an optical switch that can precisely locate a movable optical component to preselected positions for realizing optical paths switching.

2. Description of Related Art

Optical signals are commonly transmitted in optical fibers, which provide efficient light channels through which optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

In optical fiber systems, various mechanisms have been previously developed for switching optical signals between fiber cables. Among these previously developed mechanisms, one important category is mechanical optical switches.

Mechanically operated optical switches come in two different designs: in one design, the optical components move, and in the other design, the fibers move. Factors for assessing the capability of an optical switch include low insertion loss (<1 dB), good isolation performance (>50 dB) and bandwidth capacity compatible with the fiber network the switch is supporting.

Figure 10:
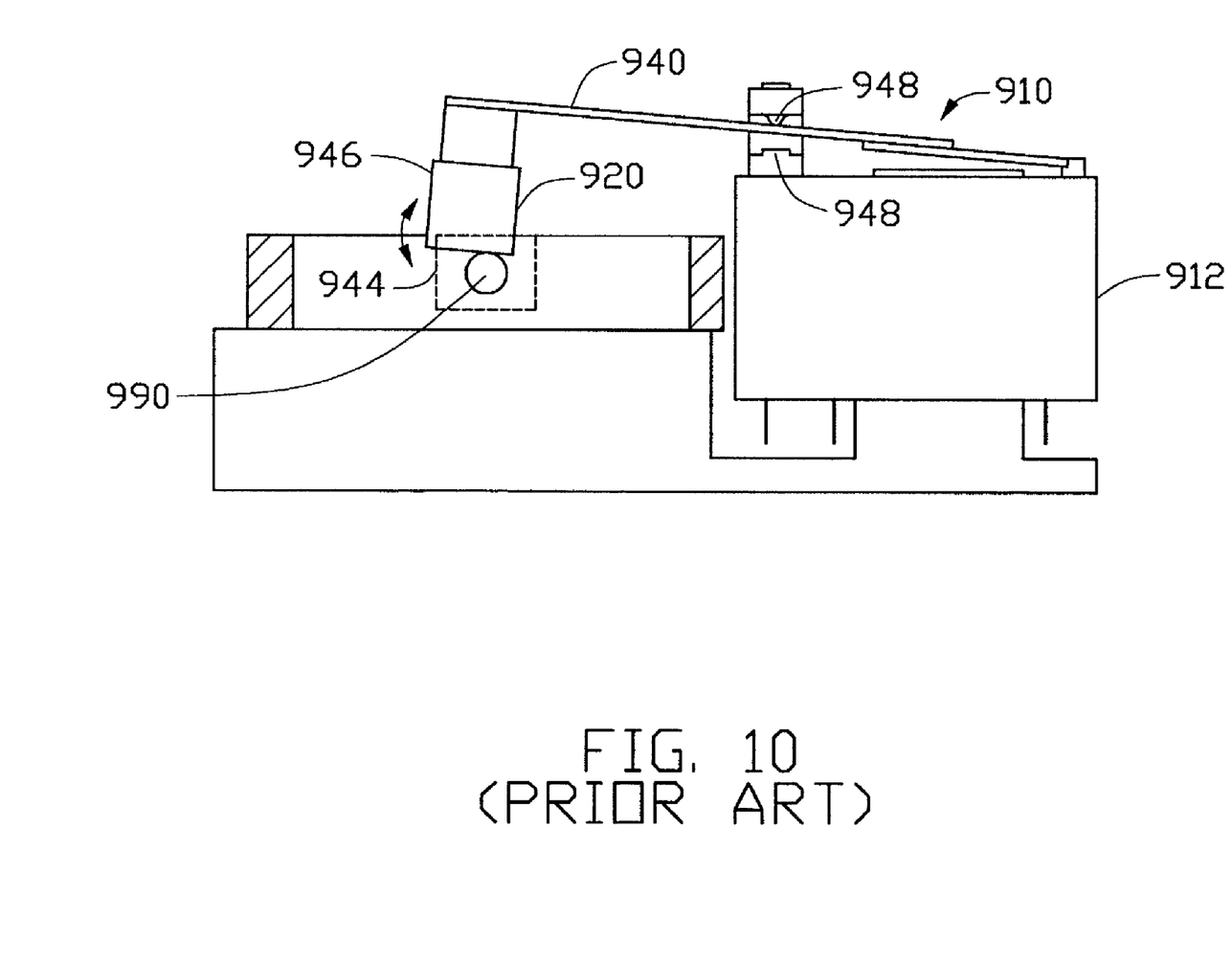
FIG. 10 is a partially cross-sectional view of a prior art optical switch.

In moving optical component switches, a driving mechanism drives one or more optical components to move between different positions to effect the switching operation. The driving mechanism may be a motor or a solenoid with no self-latching mechanism, which needs an attached latching mechanism to locate the optical component in the different positions. In general, the attached mechanism is large in size. As shown in FIG. 10, U.S. Pat. No. 5,742,712 describes a mechanical optical switch 910 having a relay 912. The relay 912 includes an arm 940, which supports a mirror 920. In response to electrical signals supplied to the relay 912, the arm 940 of the relay 912 moves the mirror 920 between a first position 944 and a second position 946. The travel of the arm 940 is limited by stops 948, which determine the first and second positions of the mirror 920.

In this mechanical optical switch 910, the stops 948 are opposite a middle part of the arm 940. The weight of the mirror 920 bends the arm 940 over time, which results in misalignment of the mirror 920 and connected fibers 990.

For the above reasons, an improved optical switch is desired. In particular, an optical switch is desired which has high optical efficiency and which can precisely position the switching element in the different switching states.

BRIEF SUMMARY OF THE INVENTION

An object of the invention is to provide an optical switch which includes a rotating mechanism to effect switching states.

Another object of the invention is to provide an optical switch which provides precise positioning of associated switching elements in the different switching states and which has a low insertion loss.

Yet another object of the present invention is to provide an optical switch which is small in size.

An optical switch in accordance with one embodiment of the present invention comprises a housing, a switching element, a driver, a holder, an input port and an output port. The switching element, the driver and the holder are accommodated in a chamber formed in the housing. The holder holds the input and output ports in alignment with one another and is assembled with the switching element, which comprises an optical component assembly and a rotating mechanism. The optical component assembly is soldered to the rotating mechanism and can be moved between a bottom stopper (a downward position), where a prism of the optical component assembly is in the optical paths between the input port and the output port, and a top stopper an upward position), where the prism of the optical component assembly is out of the optical paths.

Other objects, advantages and novel features of the invention will become more apparent from the following detailed description when taken in conjunction with the accompanying drawings.

DETAILED DESCRIPTION OF THE INVENTION

Figure 1:
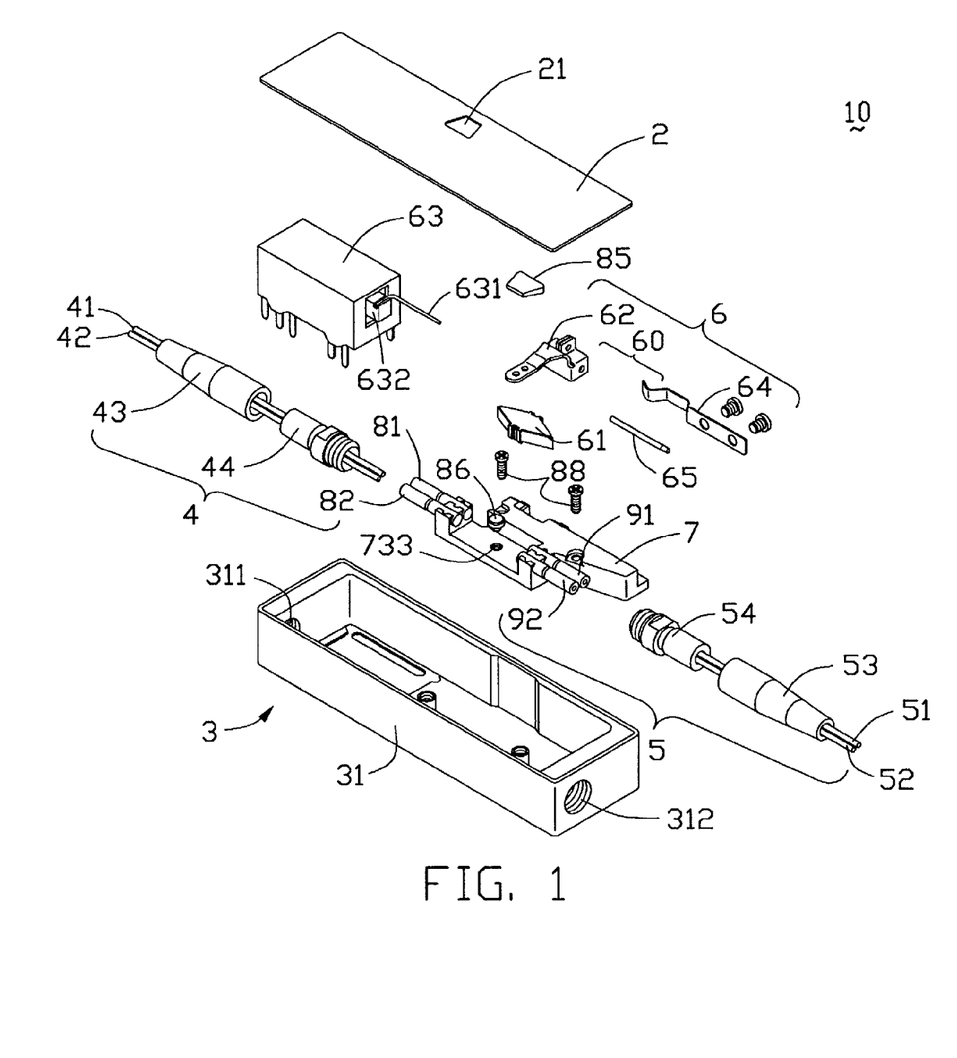
FIG. 1 is an exploded view of an optical switch of the present invention.

Referring to FIG. 1, an optical switch 10 according to the present invention switches signals coming from a first and second input fibers 41, 42 between first and second output fibers 51, 52. The optical switch 10 comprises a housing 3, a switching element 6, a driver 63, a holder 7, an input port 4, an output port 5, a top stopper 85 and a bottom stopper 86. The housing 3 comprises an elongate, box-shaped base 31 defining two opposite side holes 311, 312 having interior threads therein, and a top cover 2 defining a slot 21. The housing 3 accommodates the switching element 6, the driver 63, the holder 7, the top stopper 85, the bottom stopper 86, and parts of the input and output ports 4, 5, as described below, therewithin.

Figure 2:
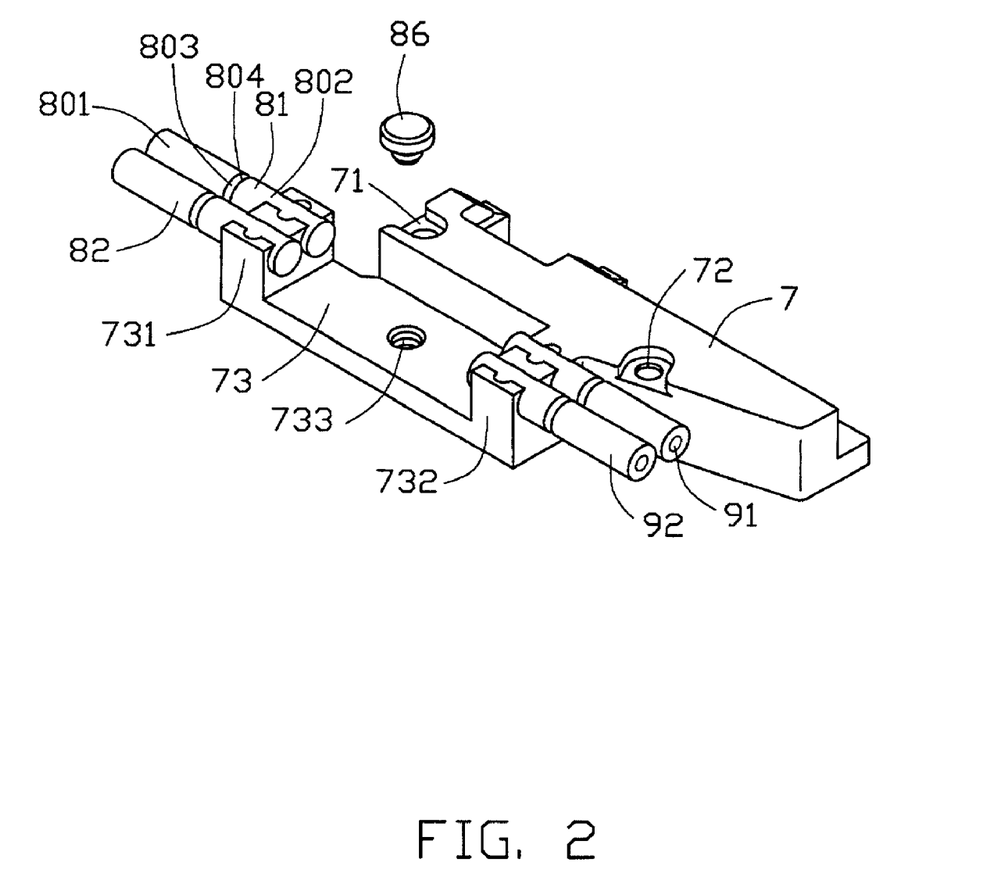
FIG. 2 is a perspective view of a holder and aligned collimators of the optical switch in FIG. 1.
Figure 3:
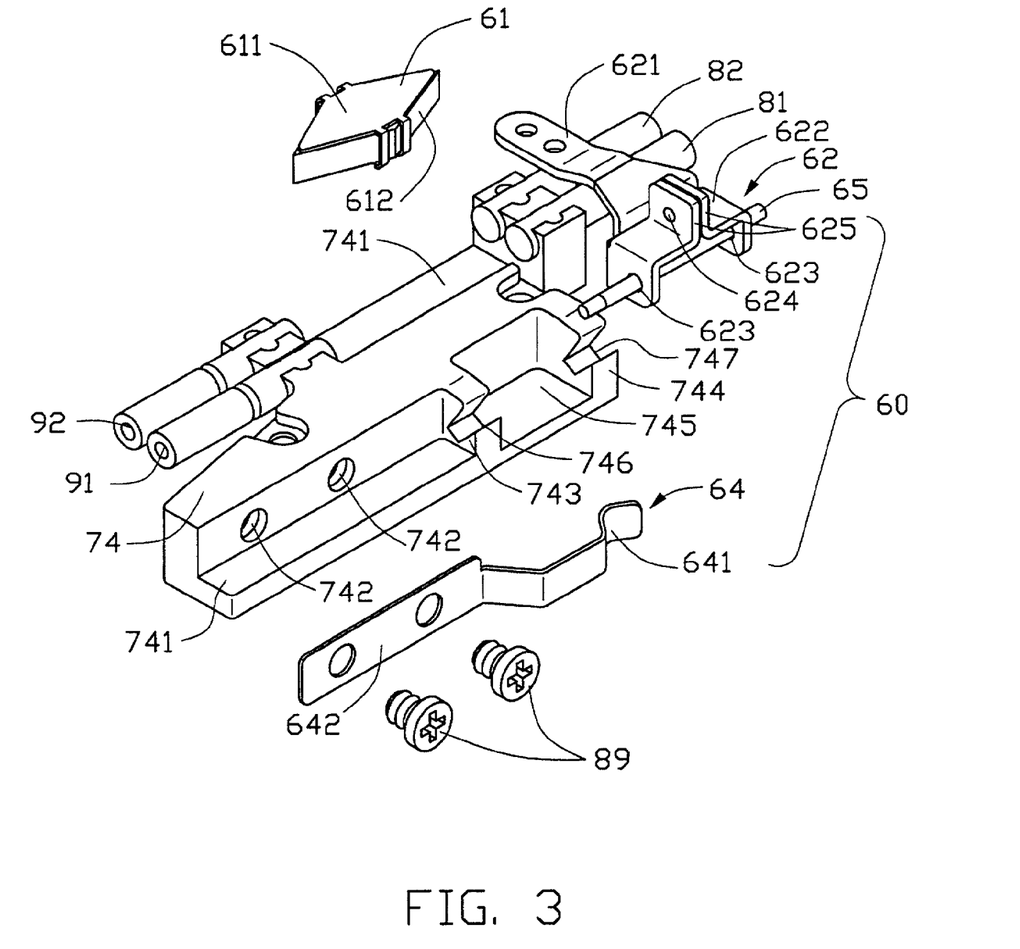
FIG. 3 is a partially exploded view of a holder, aligned collimators, and a switching element of the optical switch in FIG. 1.

As shown in FIGS. 2 and 3, the holder 7 has a horizontal base plate 741 with an elongate mounting pedestal 74 extending upwardly from a central portion (not labeled) of the base plate 741. A first and second collimator holders 731, 732 protrude upwardly at a forward side of the base plate 741, each defining two collimator notches (not labeled) therein. A pair of shaft supporters 743, 744 protrudes upwardly from a rear side of the base plate 741, each defining a V-angled slot 746, 747 therein for accepting two ends of an axle shaft 65. A pair of anchor holes 71, 72 is defined in a top of the mounting pedestal 74. Two spring mounting holes 742 are defined in a rear side of the mounting pedestal 74 and a guiding hole 733 is defined in the forward side of the base plate 741 between the two collimator holders 731, 732. A chamber 73 is formed between the base plate 741, the two collimator holders 731, 732, and the mounting pedestal 74. A bracket mounting notch 745 is formed between the base plate 741, the two shaft supporters 743, 744, and the mounting pedestal 74.

Figure 4:
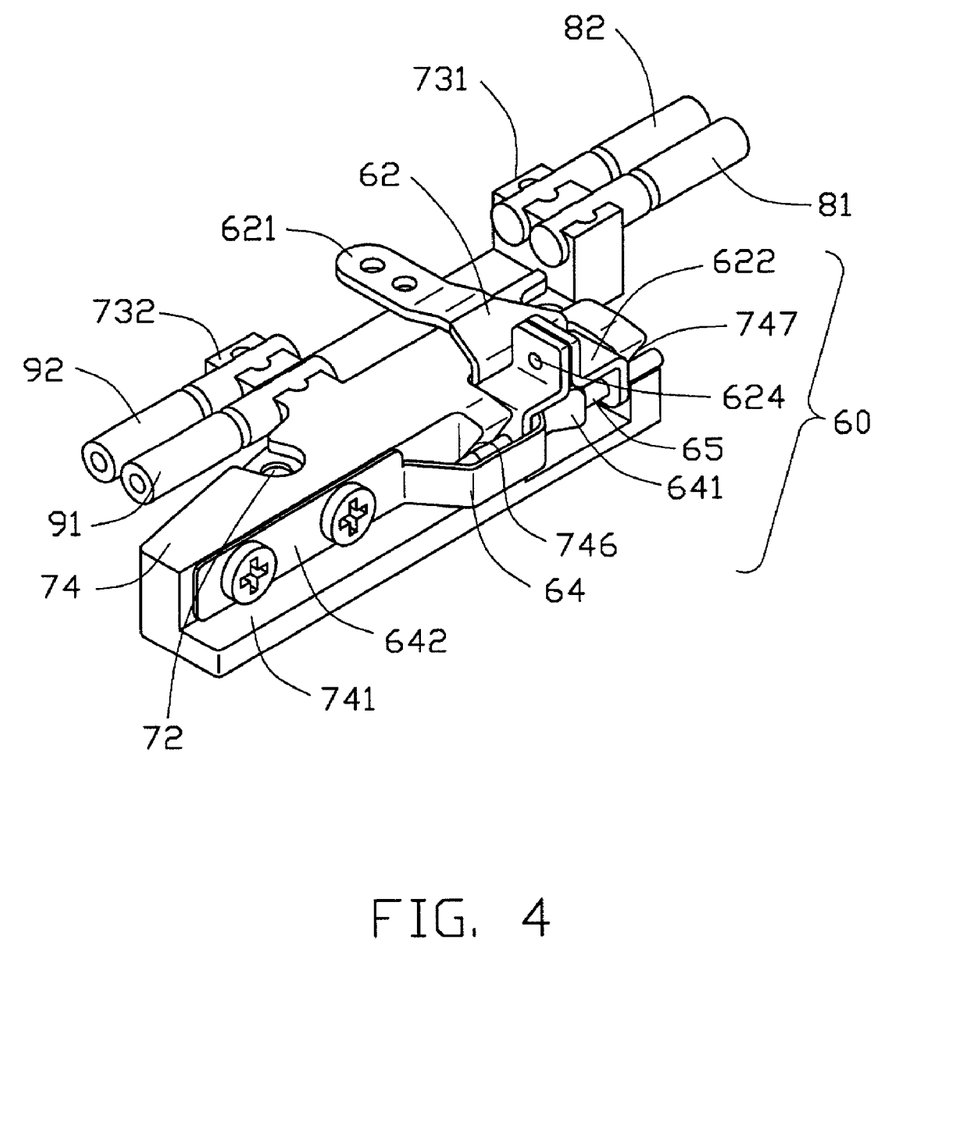
FIG. 4 is an assembled view of FIG. 3, without an optical component assembly.

Also referring to FIGS. 2–4, the switching element 6 comprises an optical component assembly 61 and a rotating mechanism 60. The optical component assembly 61 includes an optical component 612 and an optical component holder 611 engaged with the optical component 612. In this embodiment, the optical component 612 is a diamond-shaped prism 612.

The rotating mechanism 60 comprises a bracket 62, a cantilevered spring 64, and the axle shaft 65. The bracket 62 is formed from one bent piece of sheet metal, and comprises a frame 622 and a lifting arm 621. The frame 622 is roughly in the shape of an elongate rectangular box, with the lifting arm 621 bending upwardly and outwardly from a side (not labeled) of the frame 622. A pair of drive bearings 625 protrudes upwardly from a top side (not labeled) of the frame 622, each drive bearing 625 defining one of a pair of aligned drive holes 624 therethrough. Each of a pair of frame end walls (not labeled) defines a shaft hole 623 therethrough.

The cantilevered spring 64 is made of a resilient material, and has a fixing arm 642 on one end and a spring arm 641 on an opposite end. The fixing arm 642 defines two arm holes (not labeled). The spring arm 641 is bent in a sinuous shape to provide a spring force against the axle shaft 65. The axle shaft 65 is long and cylindrical in shape, and is beveled on one end to aid in inserting the axle shaft 65 through the shaft holes 623.

The driver 63 (see FIG. 1) is a relay having a self-latching function, and drives the bracket 62 to rotate. The driver 63 has a driver arm 632 extending outwardly therefrom, and an L-shaped driver shaft 631 soldered on the driver arm 632. The driver arm 632 moves in a forward and rearward direction.

Referring to FIGS. 1–2, the input port 4 comprises a first and a second input collimators 81, 82, a coupler 44, and a boot 43. The output port 5 comprises a first and a second output collimators 91, 92, a coupler 54, and a boot 53. The first input collimator 81 has a ferrule 801 and a lens 802, which are held in fixed relation to one another using epoxy or solder between angled front and back surfaces 803, 804 of the ferrule 801 and the lens 802, respectively. The lens 802 may be a GRIN (Graded Index) lens. The ferrule 801 is an elongate tube having a hollowed out interior aperture (not labeled) extending longitudinally therethrough, wherein the first input fiber 41 can be inserted. The second input collimator 82 and the first and second output collimators 91, 92 are identical in structure with the first input collimator 81, but respectively receive the second input fiber 42, the first output fiber 51, and the second output fiber 52. Each coupler 44, 54 has a tubular construction with a threaded outer surface (not labeled) on one end.

In assembly, the optical component assembly 61 is connected to the bracket 62 by soldering the optical component holder 611 to the lifting arm 621. The axle shaft 65 is inserted through the shaft holes 623 in each frame end wall (not labeled), and ends (not labeled) of the axle shaft 65 are engaged in corresponding V-angled slots 746, 747, while the frame 622 of the bracket 62 fits into the bracket mounting notch 745. The fixing arm 642 of the cantilevered spring 64 fits against the mounting pedestal 74, with the two arm holes (not labeled) aligned with the spring mounting holes 742, and with the spring arm 641 pressing against the axle shaft 65. Two arm screws 89 are inserted through the arm holes of the fixing arm 642 and are engaged in the spring mounting holes 742. The first and second input collimators 81, 82 are fixed in the collimator notches (not labeled) of the input collimator holder 731, and the first and second output collimators 91, 92 are fixed in the collimator notches (not labeled) of the second collimator holder 732. The first input collimator 81 is aligned with the first output collimator 91, and the second input collimator 82 is aligned with the second output collimator 92. The bottom stopper 86 is engaged with the guiding hole 733 in the holder 7. The driver shaft 631 of the driver 63 is inserted through the drive holes 624 in the bracket 62, and the holder 7 and driver 63 are inserted into the base 31. A pair of anchor screws 88 is inserted through the anchor holes 71, 72 and engaged with the base 31, thereby fixing the holder 7 securely in the base 31. The couplers 44, 54 are threadedly engaged in the respective side holes 311, 312. The first and second input fibers 41, 42 are threaded through the boot 43 and the coupler 44 and are fixed in the ferrules of, respectively, the first and second input collimators 81, 82. The first and second output fibers 51, 52 are threaded through the boot 53 and the coupler 54 and are fixed in the ferrules of, respectively, the first and second output collimators 91, 92. The boots 43, 53 are moved to cover rearward ends of the respective couplers 44, 54. The top stopper 85 is fixed in the slot 21 of the top cover 2, which is fixed to the base 31.

Figure 5:
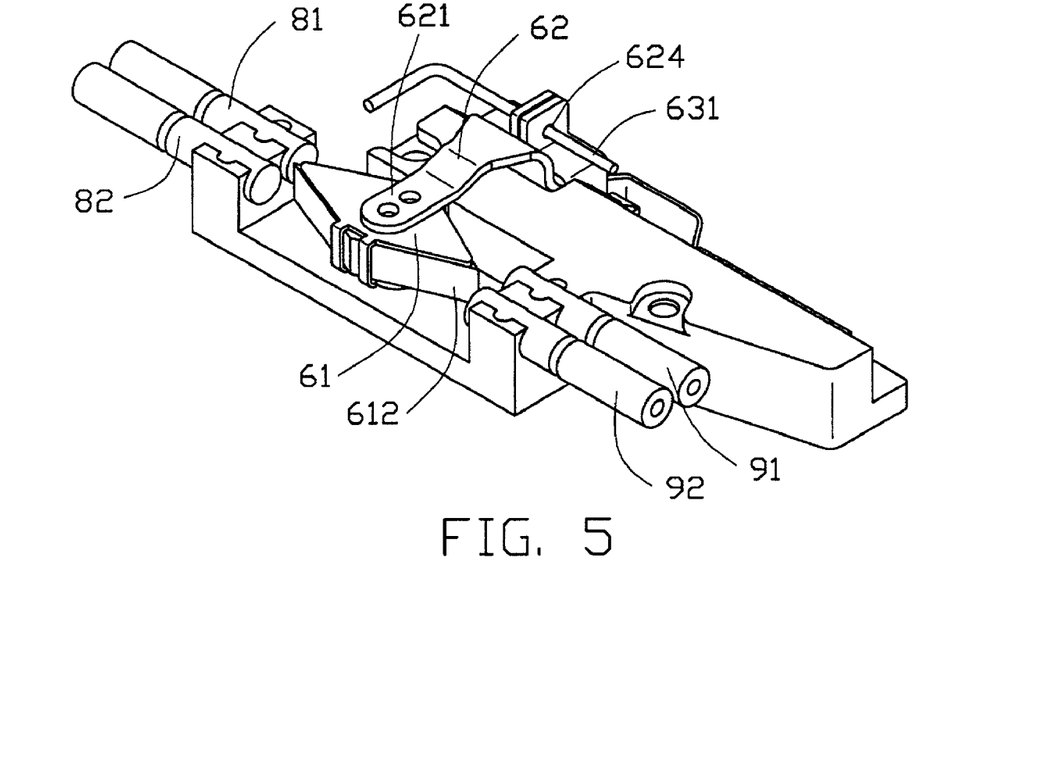
FIG. 5 is an assembled view of FIG. 3, from a reverse aspect, additionally having a driver shaft and showing the optical component assembly in a downward position.
Figure 6:
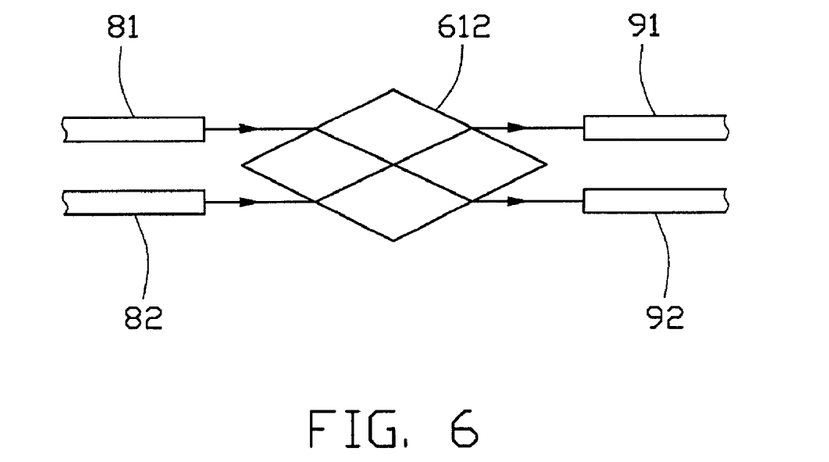
FIG. 6 is an essential optical paths diagram of the optical switch of FIG. 1, when the optical component assembly is in the downward position.
Figure 7:
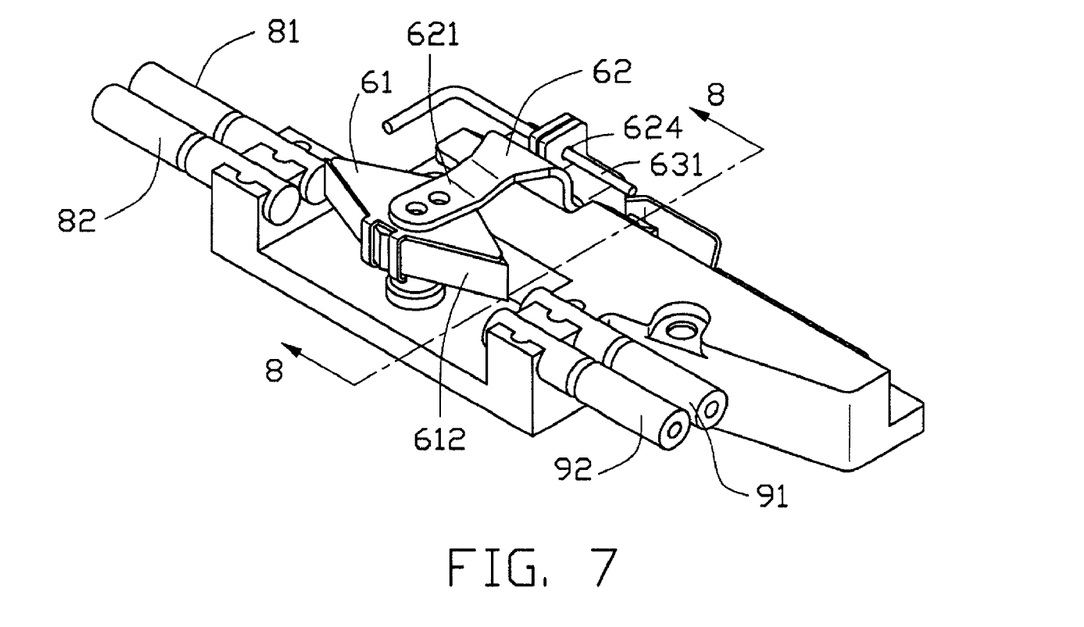
FIG. 7 is the same as FIG. 5, but with the optical component assembly in an upward position.
Figure 8:
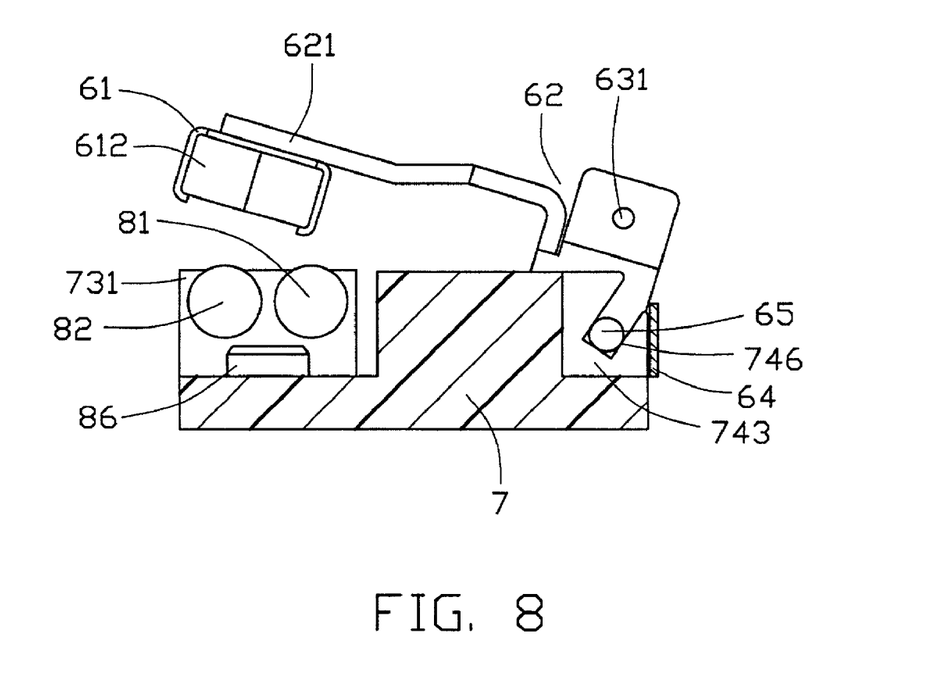
FIG. 8 is a cross-sectional view taken along the line 8—8 in FIG. 7.
Figure 9:
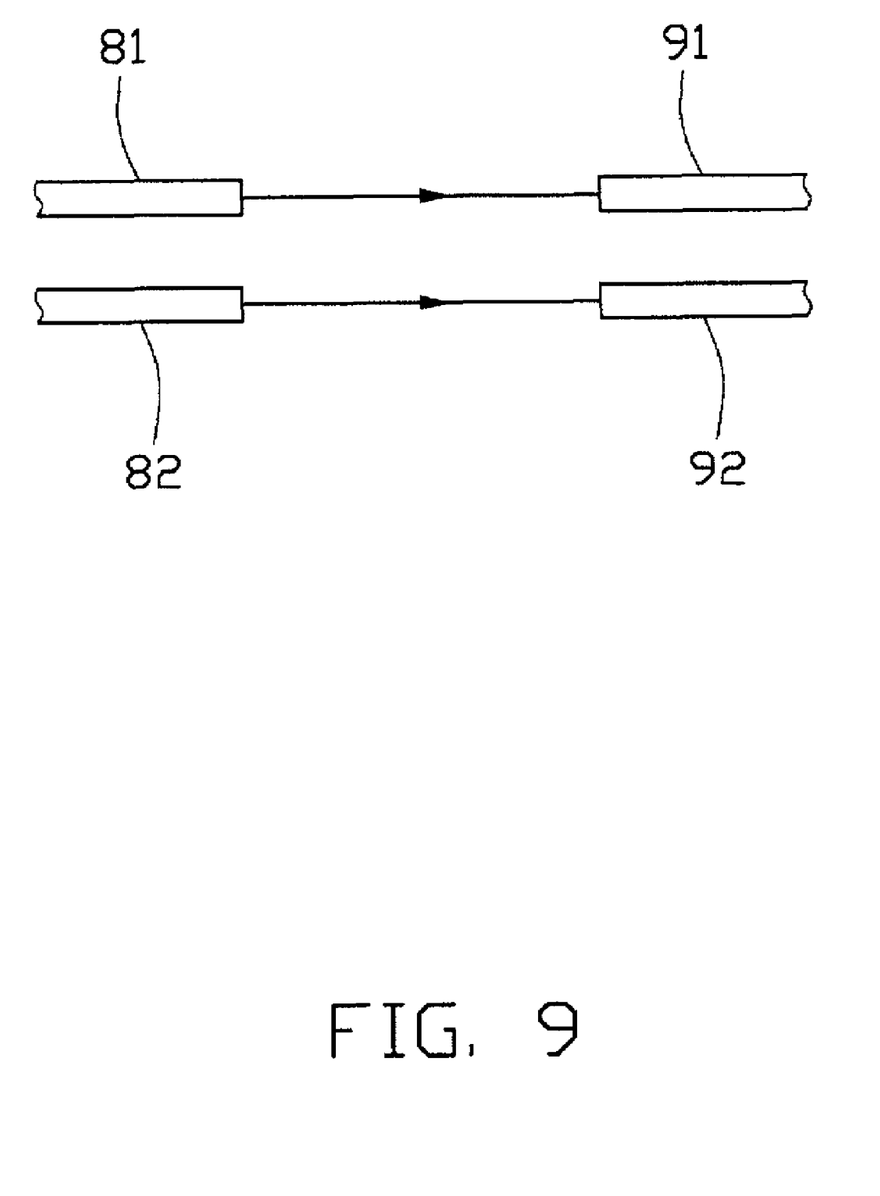
FIG. 9 is an essential optical paths diagram of the optical switch in FIG. 1, when the optical component assembly is in the upward position.

In use, the optical component assembly 61 is moved between a lowered position and a raised position. When the driver arm 632 of the driver 63 is in a forward position, the prism 612 is in the lowered position, as shown in FIG. 5. When the driver 63 receives a signal to move to a rearward position, the driver arm 632 with the attached driver shaft 631 moves rearward. Since the driver shaft 631 is engaged with the drive bearing 625 on the bracket 62 via the drive holes 624, the drive bearing 625 is also driven rearward with the driver shaft 631. This rearward movement of the drive bearing 625 rotates the bracket 62 around the axle shaft 65, which raises the lifting arm 621 and the prism 612, as shown in FIGS. 7–8, until the lifting arm 621 abuts the top stopper 85. When the driver 63 receives a signal to move to the forward position, the process is reversed and the prism 612 is lowered until the optical component assembly 61 abuts against the bottom stopper 86.

FIGS. 5–9 illustrate the operation of the optical switch 10. In the downward position (FIGS. 5 and 6), the optical component assembly 61 is stopped against the bottom stopper 86, and the prism 612 aligns with the input and output collimators 81, 82, 91, 92. Light beams from the first and second input fibers 41, 42 transmit through the first and second input collimators 81, 82, respectively. Each light beam is transmitted through the prism 612, and is bent along symmetrically opposite paths by the prism, to pass through the second and first output collimators 92, 91 and into the second and first output fibers 52, 51, respectively.

In the upward position (FIGS. 7–9) of the optical component assembly 61, the lifting arm 621 abuts against the top stopper 85, with the prism 612 being out of the optical paths between the input and output ports 4, 5. In this position, light beams from the first and second input fibers 41, 42 are transmitted through the first and second input collimators 81, 82, and transmit through the first and second output collimators 91, 92 into the first and second output fibers 51, 52, respectively.

The optical switch 10 of the present invention makes use of the rotating mechanism 60, the top stopper 85 and the bottom stopper 86 to move the prism 612 between two precisely located positions.

Advantages of the optical switch 10 of the present invention over those of the prior art include the following. First, the driver has a self-latching function. Second, the size of the optical switch is small, since no separately attached latching mechanism is required. Third, the moveable optical component 612 is precisely located in the two different positions. Thus, the insertion loss of the optical switch is minimized.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

We claim:

1. An optical switch for switching optical signals between a plurality of input and output optical fibers, comprising:
   a holder;
   a first stopper;
   a second stopper;
   a driver;
   at least one input collimator aligning with the input fibers and collimating the input light;
   at least one output collimator aligning with the output fibers and collimating the output light; and
   a switching element assembled with the holder and having an optical component displaceable between a first and a second positions and a rotating mechanism which rotationally moves the optical component between the first stopper (corresponding to the first position) and the second stopper (corresponding to the second position);
   whereby, when the switching element is in the first position, the optical component is in optical paths from the input collimators to the output collimators, and light beams from the input fibers transmit sequentially through the input collimators, the optical component, the output collimators, and then to the output fibers; and when the switching element is in the second position, the optical component is out of the optical paths, and light beams from the input fibers transmit through the input collimators, the output collimators, and to the output fibers without being bent or deflected by the optical component, to transmit to different output fibers.

2. The optical switch as claimed in claim 1, wherein the rotating mechanism comprises a bracket with the optical component fixed thereto, which is actuated to rotate and rotationally moves the optical component between the first stopper (the first position) and the second stopper (the second position).

3. The optical switch as claimed in claim 2, wherein the rotating mechanism further comprises an axle shaft rotationally engaged with the bracket, which axle shaft is engaged with the holder to allow the bracket to rotate with respect to the holder.

4. The optical switch as claimed in claim 3, wherein the rotating mechanism further comprises a cantilevered spring with a front end abutting against the axle shaft and elastically pressing the axle shaft against the holder to hold the axle shaft and the bracket in place and a rear end mounted on the holder.

5. The optical switch as claimed in claim 1, further comprising a housing which has a base accommodating the switching element, the driver and the holder therein, and a top cover fixing the second stopper.

6. The optical switch as claimed in claim 1, wherein the holder has a guiding hole to fix the first stopper.

7. The optical switch as claimed in claim 1, wherein the driver is a relay driving the rotating mechanism to rotate and resulting in the optical component moving between the first position and the second position when an electrical signal is applied to the relay.

8. The optical switch as claimed in claim 1, wherein the optical component is a prism or a mirror.

9. The optical switch as claimed in claim 1, wherein the input fibers and the output fibers are accommodated in respective boots for being prevented from flexing excessively.

10. The optical switch as claimed in claim 1, wherein the holder has two collimator holders at a forward side to hold the input collimators and the output collimators in alignment with each other.

11. The optical switch as claimed in claim 10, wherein the holder further has two shaft supporters at a rear side to support the axle shaft.

12. An optical switch for switching optical signals between a plurality of input and output optical fibers, comprising:
    a holder;
    at least one input collimator aligning with the input fibers and collimating the input light;
    at least one output collimator aligning with the output fibers and collimating the output light; and
    a switching element assembled with the holder, the switching element having:
      an optical component displaceable between a first position and second position;
      a bracket to which the optical component is fixed, which bracket is actuated to rotate and rotationally moves the optical component between the first position and the second position;
      an axle shaft rotationally engaged with the bracket, which axle shaft engages with the holder to fix the bracket in rotational engagement with the holder; and
      a cantilevered spring abutting against the axle shaft, which cantilevered spring elastically presses the axle shaft against the holder to hold the axle shaft and the bracket in place;
    whereby, when the switching element is in the first position, the optical component is positioned in the optical paths between the input and the output fibers, and light beams from the input fibers transmit sequentially through the input collimators, the optical component, the output collimators, and then to the output fibers, respectively, having been bent or deflected by the optical component to transmit through a different output fiber than would be the case if the light beams had not transmitted through the optical component and when the switching element is in the second position, the optical component is positioned out of the optical paths, and light beams from the input fibers directly transmit to the output fibers without being bent or deflected by the optical component to transmit to different output fibers.

13. The optical switch as claimed in claim 12, further comprising at least one first stopper to locate the first position and at least one second stopper to locate the second position of the optical component.

14. The optical switch as claimed in claim 13, further comprising a housing which has a base accommodating the switching element, the driver and the holder therein, and a top cover fixing the second stopper.

15. The optical switch as claimed in claim 13, wherein the holder has a guiding hole to fix the first stopper.

16. The optical switch as claimed in claim 12, wherein the holder has two collimator holders at a forward side to hold the input collimators and the output collimators in alignment with each other.

17. The optical switch as claimed in claim 16, wherein the holder further has two shaft supporters at a rear side to support the axle shaft.

18. The optical switch as claimed in claim 12, further comprising a driver, which drives the rotating mechanism to rotate and makes the optical component move between the first position and the second position.

19. The optical switch as claimed in claim 12, wherein the optical component is a prism or a mirror.

20. The optical switch as claimed in claim 12, wherein the input fibers and the output fibers are accommodated in respective boots for being prevented from flexing excessively.

21. An optical switch comprising:

two pairs of collimators positioned by two sides of a moveable prism;

said prism held by an L-shaped holder, said holder controlled by two shafts wherein one is translated while the other is moved along a slanted groove so as to have said holder moved in a tilting manner for making said prism moveable up and down between said two pairs of collimators.

* * * * *